US00RE39880E

(19) United States
(12) Reissued Patent
McPherson

(10) Patent Number: US RE39,880 E
(45) Date of Reissued Patent: Oct. 16, 2007

(54) DUAL-FEED SINGLE-CAM COMPOUND BOW

(75) Inventor: Mathew McPherson, Norwalk, WI (US)

(73) Assignee: Sop Services, Inc., Las Vegas, NV (US)

(21) Appl. No.: 10/934,630

(22) Filed: Sep. 3, 2004

Related U.S. Patent Documents

Reissue of:

(64) Patent No.: 6,443,139
Issued: Sep. 3, 2002
Appl. No.: 09/160,983
Filed: Sep. 25, 1998

U.S. Applications:

(63) Continuation of application No. 08/047,481, filed on Apr. 19, 1993, now Pat. No. 5,890,480, which is a continuation-in-part of application No. 07/875,748, filed on Apr. 28, 1992, now Pat. No. 5,368,006.

(51) Int. Cl.
*F41B 5/10* (2006.01)

(52) U.S. Cl. ..... 124/25.6

(58) Field of Classification Search ..... 124/25.6, 124/900

See application file for complete search history.

(56) References Cited

U.S. PATENT DOCUMENTS

| | | | | | |
|---|---|---|---|---|---|
| 3,990,425 | A | | 11/1976 | Ketchum | |
| 4,365,611 | A | * | 12/1982 | Nishioka | 124/25.6 |
| 4,838,236 | A | * | 6/1989 | Kudlacek | 124/25.6 |
| 4,986,250 | A | * | 1/1991 | Darlington | 124/25.6 |
| 5,368,006 | A | * | 11/1994 | McPherson | 124/25.6 |

* cited by examiner

*Primary Examiner*—John A. Ricci
(74) *Attorney, Agent, or Firm*—Woodard, Emhardt, Moriarty, McNett & Henry LLP

(57) ABSTRACT

A cam is eccentrically journaled at one end of a compound archery bow and a pulley is journaled at the other end of the bow. A cable passes around the pulley to form a bowstring section and a second cable section, both sections forming a dual feed single cam compound bow. The amount of feed out to both ends of the bowstring is approximately the same. One embodiment of the cam provides a large radius cam groove and a smaller radius cam groove which are designed to synchronize the rate of cable feed out at both ends of the bowstring section during the drawing operation. An anchor cable is provided to tie the two limbs of the bow together during the flexing of the bow.

24 Claims, 6 Drawing Sheets

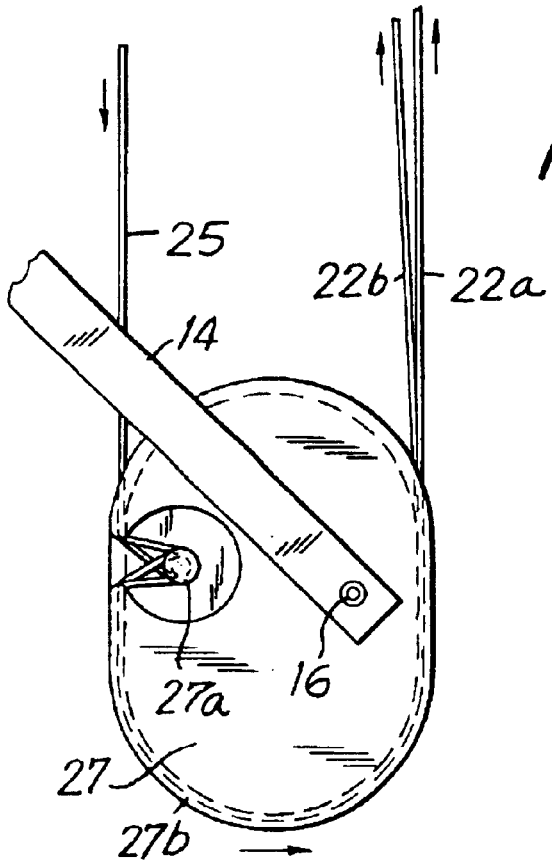
FIG. 7
FIG. 8
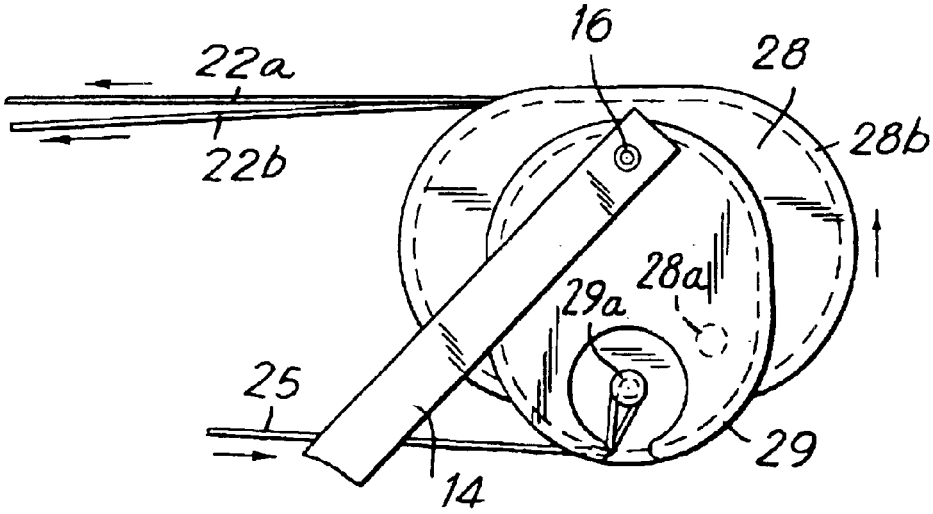

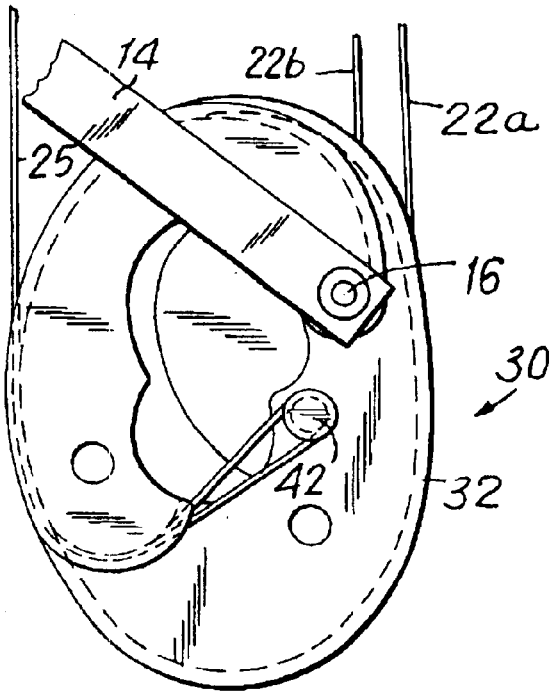
FIG. 9
FIG. 10
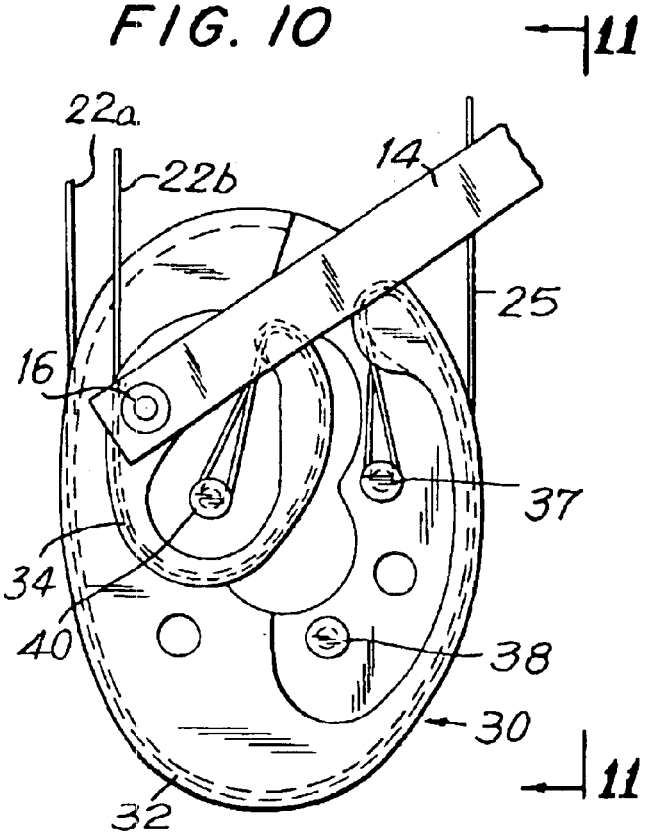
FIG. 11
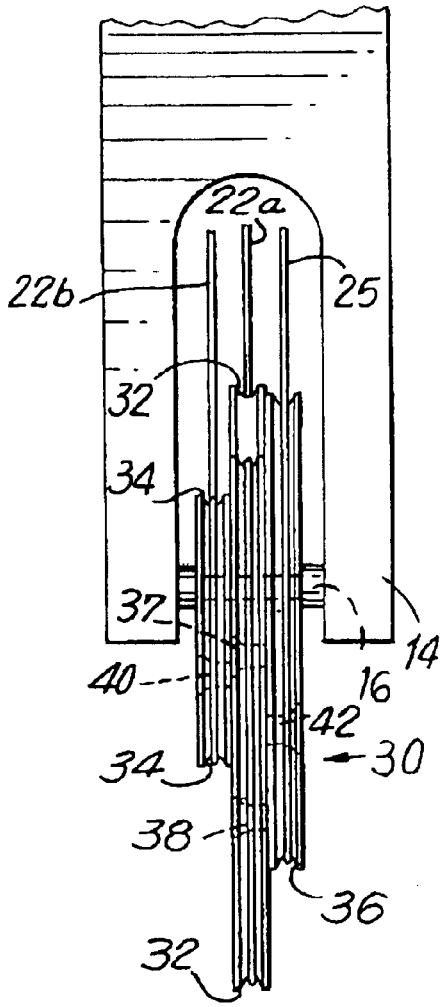

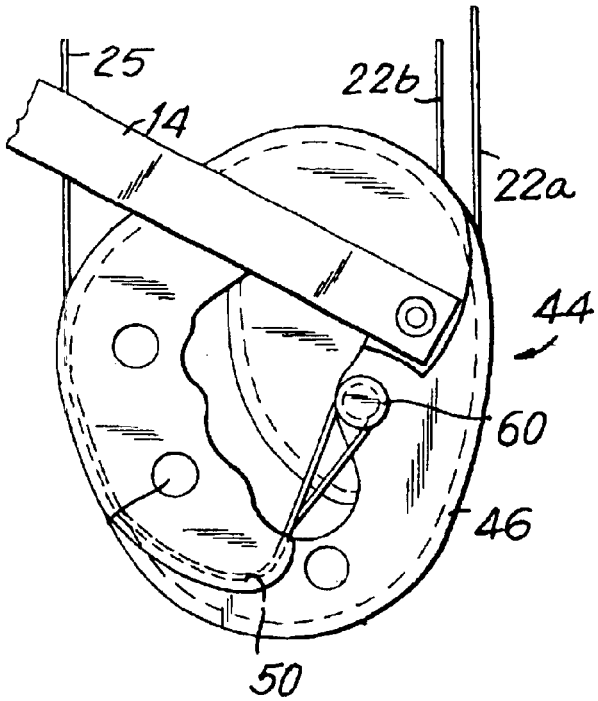
FIG. 12
FIG. 13
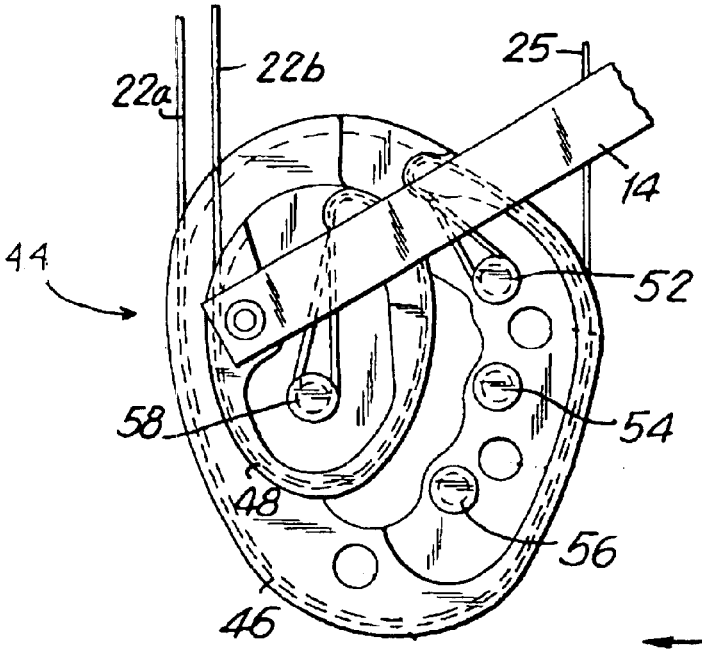
FIG. 14
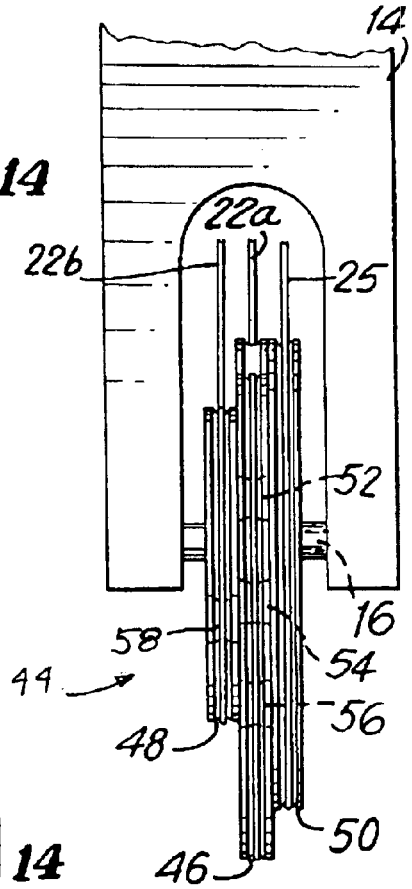

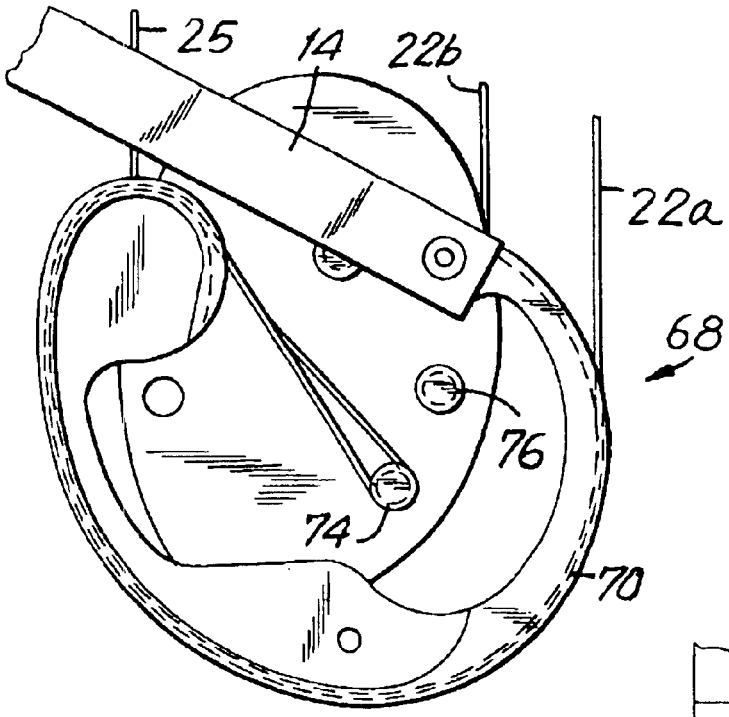
FIG. 15
FIG. 17
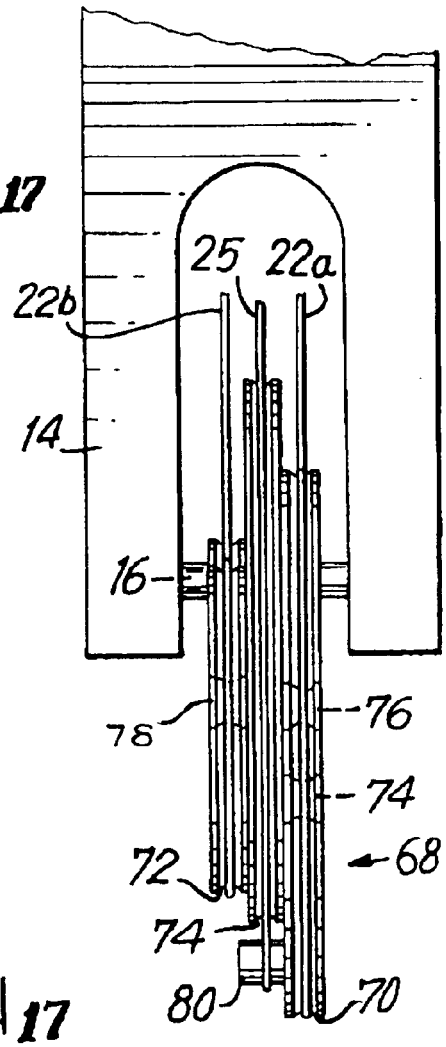
FIG. 16
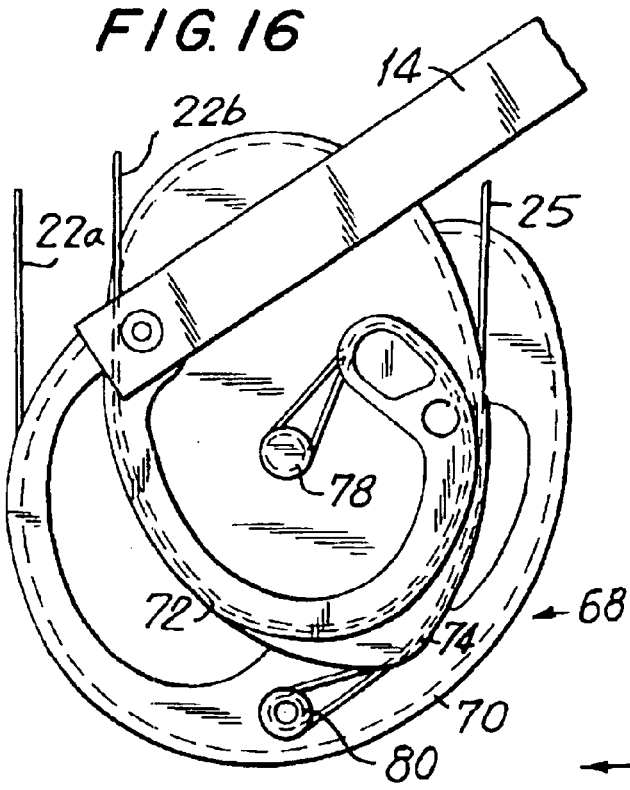

DUAL-FEED SINGLE-CAM COMPOUND BOW

Matter enclosed in heavy brackets [ ] appears in the original patent but forms no part of this reissue specification; matter printed in italics indicates the additions made by reissue.

This application is a continuation of application Ser. No. 08/047481, filed Apr. 19, 1993, now U.S. Pat. No. 5,890,480, which is a continuation-in-part of application Ser. No. 07/875748, filed Apr. 28, 1992, now U.S. Pat. No. 5,368,006.

BACKGROUND OF THE INVENTION

In the past, most compound archery bows have used two cams, respectively mounted on the limb tips at opposite ends of the bow to provide the means to store more energy in the draw cycle and to reduce the force necessary to hold the bowstring in the full draw position. Examples of such compound bows are disclosed in the following U.S. patents.

| U.S. Pat. No. | Issued To | Date Issued |
|---|---|---|
| 3,486,495 | Allen | Jun. 23, 1966 |
| 3,890,951 | Jennings, et al. | Jun. 24, 1975 |
| 4,060,066 | Kudlacek | Nov. 29, 1977 |
| 4,079,723 | Darlington | Mar. 21, 1978 |
| 4,112,909 | Caldwell | Sep. 12, 1978 |
| 4,300,521 | Schmidt | Nov. 17, 1981 |

The early compound bows utilized cams consisting of eccentrically mounted circular shaped elements. As the desire for more stored energy and greater arrow velocities developed, special shaped cam elements were designed to provide these characteristics. These shaped cam elements, like the circular shaped elements, were mounted on the limb tips. It is well known in the art that to obtain the best bow performance, the cam elements at each end of the bow should be properly synchronized with each other. Patents disclosing various means to accomplish proper cam synchronization include the following:

| U.S. Pat. No. | Issued To | Date Issued |
|---|---|---|
| 3,841,295 | Hunger | Oct. 15, 1974 |
| 3,958,551 | Ketchum | May 25, 1976 |
| 4,103,667 | Shepley, Jr. | Aug. 1, 1978 |
| 4,178,905 | Gromer | Dec. 18, 1979 |

The more modern compound bows have reverted back to the more simplistic design of the original U.S. Pat. No. 3,486,495 Allen patent, but the requirement for cam synchronization is still present as noted, for example, by the teachings of the following patents:

| U.S. Pat. No. | Issued To | Date Issued |
|---|---|---|
| 4,372,285 | Simonds | Feb. 8, 1983 |
| 4,440,142 | Simonds | Apr. 3, 1984 |
| 4,909,231 | Larson | Mar. 20, 1990 |

It is obvious, of course, that the use of a single cam avoids the problem of cam synchronization and, in fact, there are single cam bows known in the prior art. One such bow, popularly referred to as the "DynaBo" was invented by Len Subber. The original Dynabo design had one working limb located at the upper end of the bow handle. A single cam element was mounted on a rigid pylon at the lower end of the bow. The single cam element functioned in the same manner as the cam elements on the previously mentioned two cam bows. As the Dynabo was drawn, one track of the cam element payed out line to the bowstring which was fixed to the upper limb tip and the other track on the cam element acted as a take-up reel for a second line that was also anchored at the tip of the upper working limb.

Since there was only a single cam element, there was not a synchronization problem between two cams. There was, however, a problem is synchronizing the rate that the cam fed out cables to the bowstring at the lower end of the bow and the rate that the flexing of the upper limb feed out cable to the bowstring at the upper end as the bow was drawn. The result was a rather unpleasant feel to the bow as it was drawn and there was a drastic movement of the nocking point and the rear end of the arrow as the bow was drawn and released. This, in turn, made it very difficult to achieve good arrow flight from the bow under normal conditions. An early version of the DynaBo was described in the September 1976 edition of "Archery World" beginning at page 28.

The Dynabo single cam concept was offered in at least three different versions from as many manufacturers during the 1970's, and at least one manufacturer, Graham's Custom Bows, employed the Dynabo concept, with two working limbs. A description of the Graham bow is contained in the June/July edition of "Archery World" magazine. The Dynabo bow, however, never did become an acceptable alternative to the two cam bows and, in fact, appears to have lost whatever popularity it had achieved by the late 1970's.

Another known prior art device that had the capability of providing a solution to the previously mentioned problems of cam synchronization and synchronized box string feed out (the latter being desirable to enable the nock end of the arrow to travel in a smooth, consistent path upon draw and release of the arrow) is set forth in U.S. Pat. No. 4,562,824 issued to Jennings. This patent teaches the use of a single multiple grooved cam mounted on a pylon attached to the bow handle. The cam had one string track feeding cable attached to an idler pulley mounted in the limb tip at one end of the bow and a second track feeding line to a second idler pulley mounted in the second limb tip at the other end of the bow. The cam also has two additional tracks, each of which are taking up line while the string tracks are feeding out line to the bow string. One take-up track is taking up a line which is anchored at one limb tip while the other take-up track is taking up a line which is anchored at the opposite limb tip. Thus, the '824 patent teaches a highly complicated system, as compared to the present invention, that is composed of considerably more parts resulting in a compound bow having greater mass weight than the more conventional two cam compound bow.

A single cam bow developed by Larry D. Miller in the late 1970's or early 1980's was the subject of a U.S. patent application titled "Archery Bow Assembly" (hereinafter referred to as the "Miller application"). The Miller application discloses the use of a single pulley, having two grooves thereon for feeding out line to the bow string. The primary groove is circular and concentric with the axle of the circular pulley. The secondary groove, also circular, may be slightly eccentric for the purpose of maintaining the nocking point of the bowstring perpendicular to the handle section of the bow. A third eccentric groove carries a take-up cable to provide the entire means of compounding (i.e. achieving the desired reduction in holding weight at full draw and storage of energy).

The Miller application, the serial number of which is not known, may be considered material to the examination of the subject application.

SUMMARY OF THE INVENTION

The present invention embodies a simple, lightweight compound bow construction which solves the cam synchronization problem of two cam bows and overcomes the problems of synchronously feeding out cable to the upper and lower ends of the bowstring. The resulting bow has a smooth, desirable mocking point travel path which enables ease in matching arrows to the bow and provides consistency in performance.

A cam is eccentrically journaled at one limb end of the bow and a pulley is journaled at the other limb end of the bow. A cable passes around the pulley to form a bowstring section and a second cable section, both sections forming a dual feed single cam compound bow. The amount of feed out to both ends of the bowstring is approximately the same. One embodiment of the drop-off cam provides a large periphery cam groove and a smaller periphery cam groove which are designed to synchronize the rate of cable feed-out at both ends of the bowstring section during the drawing operation. Other embodiments of the invention are also disclosed.

An anchor cable is provided to tie the two limbs of the bow together during the flexing of the bow. The anchor cable may be fixed at one end to the axle of the concentric pulley and at the other end fixed in a groove in the cam to synchronize the flexing action of the bow limbs.

DETAILED DESCRIPTION OF THE DRAWINGS

FIG. 7 is a side elevational view, similar to the view, shown in FIG. 2, and showing an alternative embodiment of the cam of the present invention;

FIG. 8 is a side elevational view, similar to the view shown in FIG. 2, and showing another embodiment of the cam of the present invention;

FIG. 9 is a side elevational view, similar to the view shown in FIG. 2, and showing a still further embodiment of the cam of the present invention;

FIG. 10 is the opposite side elevational view of the cam shown in FIG. 9;

FIG. 11 is a top plan view taken along line 11—11 of the cam shown in FIG. 10;

FIG. 12 is a side elevational view similar to the view shown in FIG. 2, and showing a still further embodiment of the cam of the present invention;

FIG. 13 is the opposite side elevational view of the cam shown in FIG. 12;

FIG. 14 is a top plan view taken along line 14—14 of the cam shown in FIG. 13;

FIG. 15 is a side elevational view similar to the view shown in FIG. 2, and showing a still further embodiment of the cam of the present invention;

FIG. 16 is the opposite side elevational view of the cam shown in FIG. 15; and FIG. 17 is a top plan view taken along line 17—17 of the cam shown in FIG. 16.

DETAILED DESCRIPTION OF THE INVENTION

Figure 1:
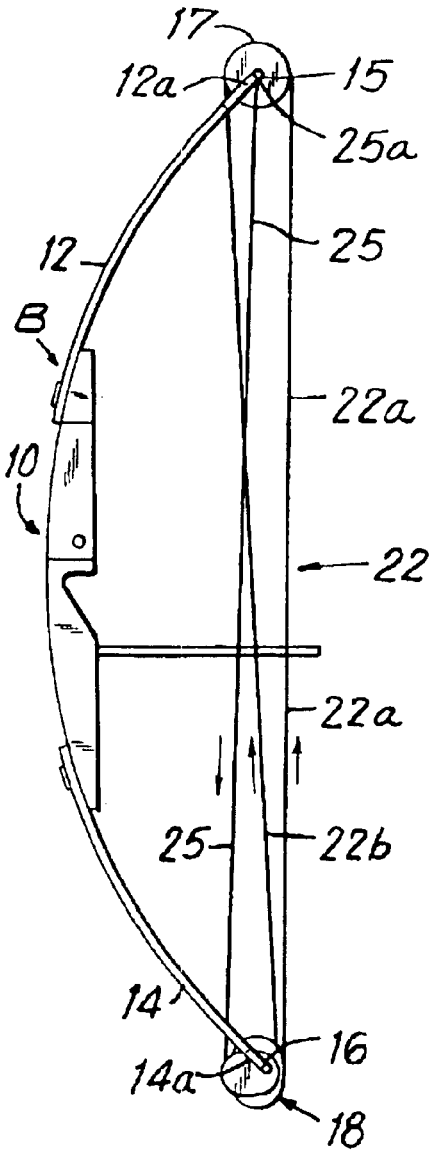
FIG. 1 is a side elevational view showing one embodiment of the invention.

In FIG. 1 of the accompanying drawings, an archery bow assembly B is illustrated which includes a central handle portion 10, having a pair of limbs 12 and 14, connected at their inner ends in fixed relation to the handle portion 10. The limbs 12 and 14 provide the desired resistance to bending which determines the draw weight of the bow and the force with which the arrow is discharged.

Figure 2:
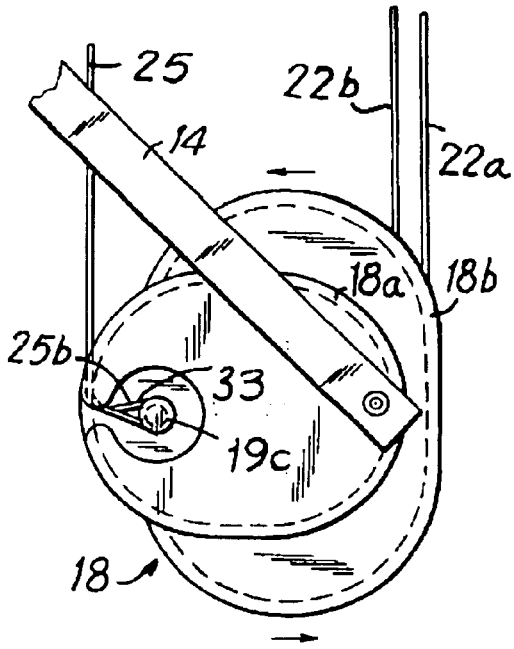
FIG. 2 is a side elevational view of the cam shown in FIG. 1.
Figure 3:
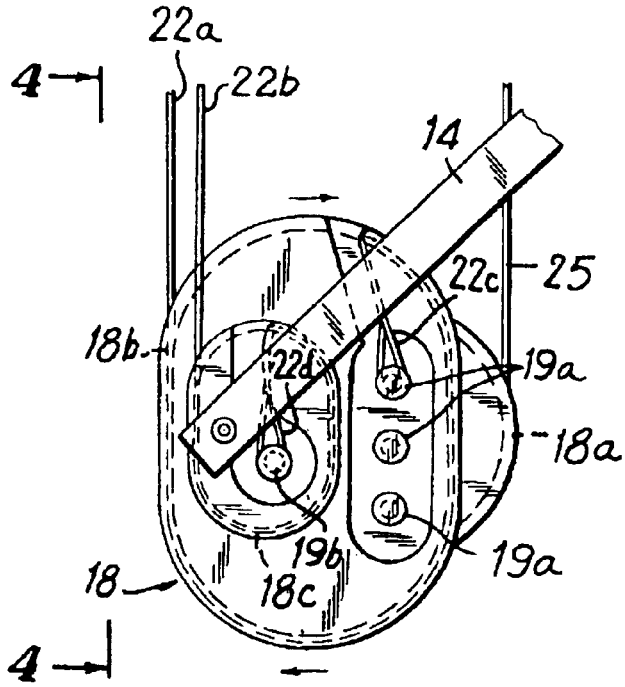
FIG. 3 is the opposite side elevational view of the cam shown in FIG. 2.
Figure 4:
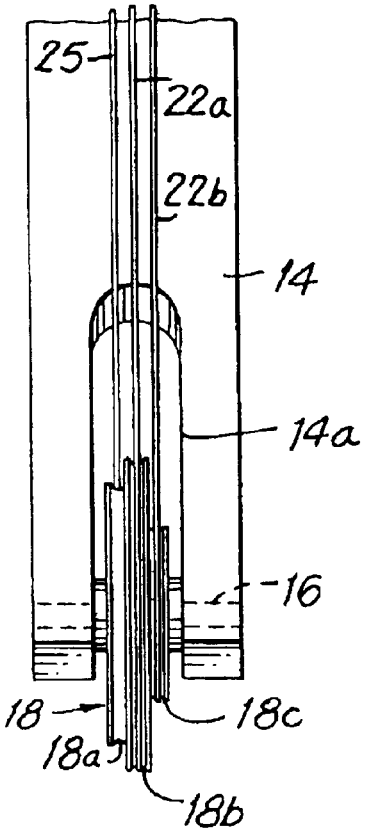
FIG. 4 is a top plan view of the cam taken along line 4—4 of FIG. 3.

As shown in FIGS. 1–4, the outer ends of the bow limbs provide wheel receiving slots which define wheel mounting forks, respectively designated by the numbers 12a and 14a, for mounting axle pins 15 and 16. A pulley 17 is concentrically mounted on the axle pin 15. In this form of the invention, the pulley 17 is provided with a single groove. As shown in FIGS. 2–4, an eccentric drop-off cam 18 is mounted on axle pin 16 and has three eccentrically oriented grooves, 18a, 18b, and 18c formed in the outer periphery thereof to provide three separate cable groove paths.

A cable 22 has a medial portion trained around concentric pulley wheel 17 to form a main cable section or bowstring 22a and a secondary or return section 22b, both of which extend across the bow and terminate at the cam 18. The ends 22c and 22d of the two sections 22a and 22b are respectively received in grooves 18b and 18c of the cam 18. The end 22c and 22d of the sections 22a and 22b are anchored to the cam 18 as by the cable anchor pins 19a and 19b fixed in said cam 18, as best shown in FIG. 3. In the form shown, three anchor pins 19a are provided to permit adjustment of the effective length of cable 22 and bowstring 22a.

Figure 5:
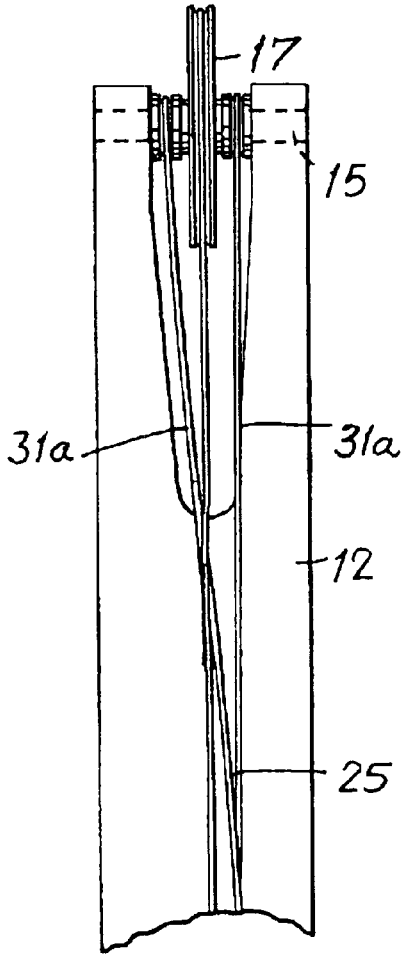
FIG. 5 is a rear elevational view of the upper limb tip portion of the archery bow of the present invention showing the anchor cable mounting on the concentric pulley axle.
Figure 6:
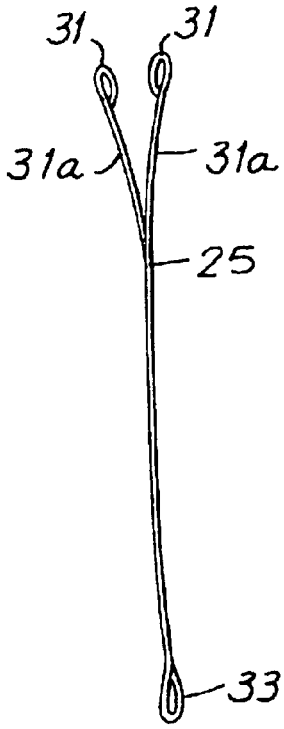
FIG. 6 is a view of the unassembled anchor cable of the present invention.

An anchor cable 25 is anchored at one end 25a to the axle 15 (see FIGS. 5 and 6) by loops 31 on sections 31a of anchor cable 25 encircling axle 15. It is seen that loops 31 extend on both sides of pulley 17 to provide load balancing and thus prevent twisting of upper limb 12. The other end of anchor cable 25 (as best shown in FIG. 2) passes around the cam groove 18a on the take-up side of the cam 18 and has a loop 33 thereon which is attached to anchor pin 19c and positively ties the ends of the bow limbs 12 and 14 together to form a direct connection between the limbs 12 and 14.

The operation of the archery bow having the eccentric cam illustrated in FIGS. 1–4 will next be described. When the archer draws the bowstring 22a, cam 18 is caused to rotate in the counterclockwise direction as viewed in FIG. 2 and bowstring 22a is fed out from cam 18 in the direction of the generally vertical arrow adjacent bowstring 22a in FIG. 1. Counterclockwise rotation of cam 18 likewise causes return section 22b to be fed out from cam 18 in the direction toward pulley 17. Return section 22b moves upwardly to the take-up side of concentric pulley 17, around and past the pulley 17 to become the second feed-out portion 22a of bowstring 22. At the same time that the bowstring section 22a is fed out, counterclockwise rotation of cam 18 causes anchor cable 25 to be taken up in groove 18a of cam 18 to cause the synchronized flexing of the bow limbs 12 and 14.

Alternative forms of the invention are illustrated in FIGS. 7 and 8, but in each case the dual-feed-out cable sections 22a and 22b operate and extend outwardly from a drop-off cam unit mounted on the limb 14 of the bow in the same manner, as described for the embodiment shown in FIGS. 1–4. In the FIG. 7 embodiment, an eccentric drop-off cam 27 is illustrated having the feed-out cable sections 22a and 22b extending outwardly therefrom toward the concentric pulley 17. The cam 27 has a single groove 27b extending all around its complete periphery with the cable sections 22a and 22b received in the groove 27b. The ends of the cable sections are anchored to an anchor pin 27a fixed to one side of the cam 27. The anchor cable 25 is also received in groove 27b and securely anchored to the anchor pin 27a, as shown in FIG. 7.

Another alternative form of the cam is illustrated in FIG. 8 which embodies eccentric drop-off cam 28 having a groove 28b thereon wherein cable sections 22a and 22b are received. A suitable anchor pin 28a is provided on the back side of the cam 28 as shown by dotted lines in FIG. 8 and both ends of cable sections 22a and 22b are secured thereto in the same manner as previously described. The anchor cable 25 is trained in groove 29 of cam 28 and secured to the anchor pin 29a of cam 28 as shown in FIG. 8. Cam 28 is eccentrically mounted on axle pin 16 connected to the limb 14 of the bow.

The embodiment of the cam shown in FIGS. 9 to 11 also operates in the manner as the eccentric cam illustrated in FIGS. 1 to 4. In this embodiment, the eccentric drop-off cam 30 has the feed out sections 22a and 22b extending outwardly therefrom toward the concentric pulley 17 (not shown). Feed out section 22a is received in a first groove 32 of cam 30 and feed out section 22b is received in a second groove 34 of smaller periphery of cam 30 which is located on one side of groove 32 of cam 30. Anchor cable 25, as best seen in FIGS. 9 and 11, is located in groove 36 of cam 30, which also is located on the side opposite of groove 32 from groove 34 of cam 30.

Feed out section 22a, as best seen in FIG. 10, may be attached to either anchor pin 37 (as shown) or anchor pin 38 on cam 30, and in this manner the effective length of feed out section 22a may be adjusted to change draw length. Feed out section 22b, also as best seen in FIG. 10, is attached to anchor pin 40 on cam 30. Anchor cable 25, as best seen in FIG. 9, is attached to anchor pin 42 which is located on the side of cam 30 opposite anchor pins 36, 38 and 40. As in the other embodiments, cam 30 is eccentrically mounted on the axle pin 16 connected to the limb 14 of the bow.

The embodiment of the cam shown in FIGS. 12 to 14 likewise operates in the manner as the eccentric cam illustrated in FIGS. 1 to 4. In this embodiment, the eccentric drop off cam 44 has the feed out sections 22a and 22b extending outwardly therefrom toward the concentric pulley 17 (not shown). Feed out section 22a is received in a first groove 46 of cam 44 and feed out section 22b is received in a second groove 48 of smaller periphery of cam 44 which is located outwardly of the center line of grooves 46 of cam 44. Anchor cable 25, as best seen in FIG. 12, is located in groove 50 of cam 44, which also is located outwardly of the center line of groove 46 of cam 44.

Feed out section 22a, as best seen in FIG. 13, may be attached to either anchor pin 52 (as partially shown) or anchor pin 54 or anchor pin 56 on cam 44 and in this manner the effective length of the feed out section 22a may be adjusted. Feed out section 22b, also as best seen in FIG. 13, is attached to anchor pin 58 on cam 44. Anchor cable 25, as best seen in FIG. 12, is attached to anchor pin 60 which is located on the side of cam 44 opposite anchor pins 52, 54, 56 and 58. As in the other embodiments, cam 44 is eccentrically mounted on the axle pin 16 connected to the limb 14 of the bow.

The embodiment of the cam shown in FIGS. 15 to 17 operates in the manner as the eccentric cam illustrated in FIGS. 1 to 4. In this embodiment, the eccentric drop off cam 68 has the feed out sections 22a and 22b extending outwardly therefrom toward the concentric pulley 17 (not shown). Feed out section 22a is received in a first groove 70 of cam 68 and feed.out section 22b is received in a second smaller periphery groove 72 of cam 68. Anchor cable 25, as best seen in FIG. 16, is located in groove 74 of cam 68, which is located intermediate of grooves 70 and 72 of cam 68.

Feed out section 22a, as best seen in FIG. 15, may be attached to either anchor pin 74 (as shown) or anchor pin 76 on cam 68 and in this manner the effective length of feed outsection 22a may be adjusted. Feed out section 22b, as best seen in FIG. 16, is attached to anchor pin 78 on cam 68. Anchor cable 25, also as best seen in FIG. 16, is attached to anchor pin 80 which is located on cam 68. As in the other embodiments, cam 68 is eccentrically mounted on the axle pin 16 connected to the limb 14 of the bow.

It has been found that a desirable approach to designing the grooves in the cam is to initially have the groove which receives bowstring 22a (the "primary groove") be approximately twice the peripheral size of the groove which receives the bowstring 22b (the "secondary groove"). The size of the primary groove may, for example, be the peripheral size of a cam on a standard bow having two independent cams. A starting point for the design of the groove which receives anchor cable 25 (the "take up groove") for use on limbs having relatively low spring rates and relatively longer limb tip travel may be, for example, to have the size and shape of the take up groove be approximately the same size and shape as the primary groove. If, however, one desires limbs having a higher spring rate and desires to reduce limb tip travel, the take up cam size will be smaller than that of the primary feed cam for a given peak draw weight. Conversely, if one desires limbs having a lower spring rate and desires to increase limb tip travel, the take up cam size would be larger than that of the primary feed cam for a given peak draw weight. The final shape of the take up cam will depend on the energy storage characteristics that are desired. Adjustments of the peripheral size and shape will then be made to the secondary groove to assure that the nocking point travels in a smooth path during the draw cycle. To achieve this, the bowstring is drawn at discrete draw length intervals, for example, at draw length intervals of one inch and at each such interval the nocking point position and travel is analyzed and, if required, the secondary groove is made either peripherally larger or smaller to assure that the nocking point travels a smooth path between intervals. By continuing this process of modifying the size and shape of the secondary groove throughout the draw length, the resulting single cam compound bow will, among other desirable features, be provided with a smooth nocking point path of travel. It should be noted that the amount of stored energy will be directly related to the leverage ratios between the primary, secondary groove shapes and will depend on the combined effect of the two bowstring let off leverage arms as compared to the leverage arm of the bowstring take up side.

Having now described my invention and the manner in which it may be used, I claim:

1. A compound archery bow comprising first and second bow limbs attached to a handle, said bow limbs having axle pins therein and wherein an eccentrically rotatably mounted cam *defining a bowstring section cam and a return section cam* is mounted on one of said axle pins *with said axle pin passing through at least said return section cam, a cable having a bowstring section attached to said bowstring section cam and a return section attached to said return section cam*, [a bowstring cable and a return cable attached to said eccentrically mounted cam,] whereby rotation of the eccentrically rotatably mounted cam by the bowstring [cable] *section* causes the bowstring [cable] *section* to be let off and whereby during at least a portion of said cam rotation the return [cable] *section* is [also] let off.

2. A compound archery bow asset forth in claim 1 and further including an anchor cable attached to the cam and whereby the rotation of the eccentrically rotatably mounted cam by the bowstring [cable] *section* causes the anchor cable to be taken up.

3. [An] *A compound archery bow comprising an* eccentrically rotatably mounted cam *defining a bowstring section cam and a return section cam, said eccentrically rotatable cam being mounted on a bow limb with an axle passing through said cam,* a [bowstring] cable attached to the *cam,* [a return cable attached to the cam] *said cable having a bowstring section attached to said bowstring section cam and a return section attached to said return section cam* and means for rotating the cam to cause the bowstring [cable] *section* to be let off and during at least a portion of said cam rotation to cause the return [cable] *section* to be let off.

4. [An eccentrically rotatably mounted cam, bowstring cable and return cable] *A compound archery bow* as set forth in claim 3, and further including an anchor cable attached to the cam and whereby the rotation of *the* cam causes the anchor cable to be taken up.

*5. The compound archery bow of claim 3, wherein said bowstring section cam and said return section cam define a large periphery cam and a small periphery cam.*

*6. The compound bow of claim 5, wherein said small periphery cam has an eccentric periphery.*

*7. The compound bow of claim 6, wherein said large periphery cam has an eccentric periphery.*

*8. A compound archery bow comprising first and second bow limbs attached to a handle, an eccentrically rotatably mounted cam mounted on one of said bow limbs with an axle passing through said cam, an anchor cable attached to an axle mounted in the second of said first and second bow limbs, a bowstring cable and a return cable attached to said eccentrically mounted cam, whereby rotation of the eccentrically rotatably mounted cam by the bowstring cable causes the bowstring cable to be let off and the anchor cable to be taken up, and, whereby during at least a portion of said cam rotation the return cable is also let off.*

*9. A compound archery bow as set forth in claim 8, wherein the first and second bow limbs each have a mounting fork, wherein a single axle is attached to each of said bow limbs through the respective mounting fork, and wherein each said single axle spans the respective mounting fork.*

*10. A compound archery bow comprising first and second bow limbs attached to a handle, said bow limbs each having a single axle pin therein and wherein an eccentrically rotatably mounted cam is mounted on the single axle pin on said second bow limb, an anchor cable attached to an axle pin in said first bow limb, a bowstring cable section attached to the cam, a return cable section attached to the cam, means for rotating the cam to cause the bowstring cable section to be let off and during at least a portion of said cam rotation to cause the return cable section to be let off, and whereby the rotation of the cam causes the anchor cable to be taken up by said cam.*

*11. A compound archery bow as set forth in claim 10, wherein the first and second bow limbs each have a mounting fork, wherein each of the single axle pins is attached to said bow limbs through the respective mounting fork, and wherein said single axle pins each span the respective mounting fork.*

*12. A compound archery bow comprising first and second bow limbs attached to a handle, an eccentrically rotatably mounted cam mounted on one of said bow limbs with an axle pin extending through said cam, an anchor cable attached between an axle pin on the one of said bow limbs opposite said cam and said eccentrically mounted cam, a bowstring cable and a return cable attached to said eccentrically mounted cam, whereby rotation of the eccentrically rotatably mounted cam by the bowstring cable causes the bowstring cable to be let off along an outer periphery of the eccentrically rotatably mounted cam, whereby during at least a portion of said cam rotation the return cable is let off along a path along a different length outer periphery of the eccentrically rotatably mounted cam, and whereby the rotation of the eccentrically rotatably mounted cam by the bowstring cable causes the anchor cable to be taken up.*

*13. A compound archery bow comprising first and second bow limbs attached to a handle, an eccentrically rotatably mounted cam defining a bowstring cam and a return cable cam mounted on one of said bow limbs with an axle extending through said bowstring cam and said return cable cam, an anchor cable attached to an axle in the one of said first and second bow limbs opposite said cam, a bowstring cable attached to said bowstring cam, a return cable attached to said return cable cam, means for rotating the cam to cause the bowstring cable to be let off and during at least a portion of said cam rotation to cause the return cable to be let off, and whereby the rotation of the cam causes the anchor cable to be taken up by said cam.*

*14. A compound archery bow comprising first and second bow limbs attached to a handle, said bow limbs each having a single axle pin therein and wherein an eccentrically rotatably mounted cam is mounted on said second limb on one of said axle pins, an anchor cable attached between the axle pin on said first limb and said eccentrically mounted cam, a second cable having a bowstring section and a return section, whereby rotation of the eccentrically rotatably mounted cam by the bowstring section causes the bowstring section to be let off and whereby during at least a portion of said cam rotation the return section is also let off.*

*15. A compound archery bow as set forth in claim 14, whereby the rotation of the eccentrically rotatably mounted cam by the bowstring section causes the anchor cable to be taken up.*

*16. A compound archery bow as set forth in claim 14, wherein the first and second bow limbs each having a mounting fork, wherein a single axle pin is attached to each of said bow limbs through the respective mounting fork, and wherein each said single axle pin spans the respective mounting fork.*

*17. A compound archery bow comprising first and second bow limbs attached to a handle, said bow limbs each having a single axle pin therein and wherein an eccentrically rotatably mounted cam is mounted on said second limb on one of said single axle pins, an anchor cable attached*

*between the axle pin on said first limb and the cam, a second cable having a bowstring section and a return section and means for rotating the cam to cause the bowstring section to be let off and during at least a portion of said cam rotation to cause the return section to be let off.*

*18. A compound archery bow as set forth in claim 17, whereby the rotation of the cam causes the anchor cable to be taken up.*

*19. A compound archery bow as set forth in claim 17, wherein the first and second bow limbs each have a mounting fork, wherein a single axle pin is attached to each of said bow limbs through the respective mounting fork, and wherein each said single axle pin spans the respective mounting fork.*

*20. A compound archery bow comprising*

*first and second bow limbs attached to a handle, said bow limbs each having a mounting fork;*

*at least one of said bow limbs having an axle pin attached therein through the respective mounting fork, said axle pin spanning the mounting fork;*

*an eccentrically rotatable cam mounted on said at least one axle pin with said axle pin passing through said cam;*

*an anchor cable attached at one end to said eccentrically mounted cam and attached at an opposing end to an axle on the other of said bow limbs;*

*a bowstring cable section and a return cable section attached to said eccentrically mounted cam;*

*wherein said cam defines a bowstring cable path and a return cable path each path including at least a portion along an outer periphery of said cam, and each path defined outward of said axle pin;*

*whereby rotation of the eccentrically rotatably mounted cam by the bowstring cable causes the bowstring cable section and the return cable section to be let off along their respective bowstring cable path and return cable path at least during portions of said rotation, and whereby during at least a portion of said rotation the anchor cable is taken up by said cam.*

*21. A dual-feed single-cam compound bow comprising*

*a pair of flexible resilient bow limbs forming first and second outer bow limb ends with a handle connecting inner ends thereof,*

*a single drop-off cam journaled on an axle pin at the first outer bow limb end and having eccentric peripheral groove portions wherein each groove portion is journaled on said axle pin,*

*a pulley concentrically journaled at the second outer bow limb end and having peripheral concentric groove portions,*

*an elongated cable having an intermediate portion trained around the concentric pulley to form two cable sections extending between the pulley and the cam, one section forming a bowstring having feed-out end portions at both ends thereof and the other section forming a take-up portion at the pulley end thereof and a feed-out portion at the cam end thereof, both received in eccentric groove portions peripheral to the cam in a manner to provide a pair of feed-out sections extending from the cam toward the pulley,*

*the ends of the two cable sections being positively anchored to the cam to produce the desired drop-off rotation of the cam when the bowstring is drawn, and*

*an anchor cable extending between the two limbs with one end thereof fixed to the second bow limb end and the other anchor cable end fixed to the cam and trained in a take-up groove portion of the cam to produce controlled flexing of the bow limbs during the drawing of the bowstring.*

*22. A compound bow as set forth in claim 21, wherein said anchor cable has two sections at one end thereon, and wherein each such section is mounted to the second outer bow limb end on opposite sides of said pulley.*

*23. A dual-feed single-cam compound bow comprising*

*a pair of flexible resilient bow limbs forming first and second outer bow limb ends with a handle connection inner ends thereof,*

*a single drop-off cam journaled on an axle pin at the first outer bow limb end and having eccentric peripheral groove portions wherein each groove portion is journaled on said axle pin,*

*a pulley concentrically journaled at the second outer bow limb end and having peripheral concentric groove portions,*

*an elongated cable, having an intermediate portion trained around the concentric pulley to form two cable sections extending between the pulley and the cam, one section forming a bowstring having feed-out end portions at both ends thereof and the other section forming a take-up portion at the pulley end thereof and a feed-out portion at the cam end thereof, both received in eccentric peripheral groove portions of the cam in a manner to provide a pair of feed-out sections extending from the cam toward the pulley,*

*the ends of the two cable sections being positively anchored to the cam to produce the desired drop-off rotation of the cam when the bowstring is drawn, and*

*an anchor cable extending between the two limbs with one end thereof fixed to the second bow limb end and the other anchor cable end fixed to the cam and trained in a take-up groove portion of the cam to produce controlled flexing of the bow limbs during the drawing of the bowstring.*

*24. A compound bow as set forth in claim 23 wherein said anchor cable has two sections at one end thereon, and wherein each such section is mounted to the second outer bow limb end on opposite sides of said pulley.*

* * * * *